United States Patent Office 3,311,535
Patented Mar. 28, 1967

3,311,535
USE OF DIPYRIDYLIUM COMPOUNDS AGAINST FISH PARASITES
Arthur A. Whipp, Medford, N.J., assignor to Chevron Research Company, a corporation of Delaware
No Drawing. Filed Nov. 15, 1963, Ser. No. 323,892
6 Claims. (Cl. 167—53)

This application is a continuation-in-part of my abandoned application Ser. No. 227,054, filed September 28, 1962.

This invention relates to a method of controlling fish diseases caused by parasitic microorganisms. More particularly, this invention relates to the prevention and curing of fish diseases caused by parasitic microorganisms.

In a wide variety of environments, fish are subject to parasitic attack leading to mortality. Fish and game commissions, as well as hobbyists, are concerned with protecting fish from various diseases induced by parasitic microorganisms. Many of the common biocides which are toxic to a variety of microorganisms are also toxic to fish.

It has now been found that fish diseases induced by parasitic microorganisms may be controlled by the use of the following compounds: 9:10-dihydro-8a,10a-diazonia - phenanthrene dihalide (1,1'-ethylene - 2,2'-dipyridylium dihalide) and N,N'-di-lower-alkyl 4,4'-dipyridylium dihalide of the following formulas respectively:

(I) 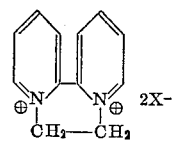

(II) 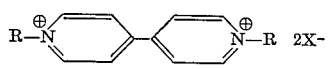

wherein X is halogen of atomic number 17 to 35, i.e., bromine or chlorine, and R is lower alkyl of from 1 to 3 carbons, preferably methyl. Moreover, not only can the diseases be prevented by the use of the dipyridylium compounds in the water environment of the fish, but once the fish has contracted the disease, the timely use of the dipyridylium compounds will often restore the fish to its original healthy condition.

The dipyridylium compounds used in this invention have been found effective against a wide number of bacteria and protozoa. The compounds have been found particularly effective against diseases caused by *Columnaris, Oodinium liminectum* and *Aeromonas liquificians*. The concentration in the aqueous environment should be at least 0.25 and should preferably not exceed 10 p.p.m. of the dipyridylium ion. That is, only the weight of the cation is considered. A preferred range is 0.25 to 5.0 p.p.m. of the cation, and particularly preferred is an amount less than 3.5 p.p.m. At these concentrations, good control of bacteria, protozoa, especially Dinoflagellates, and other parasites of fresh water and marine fish are obtained. The dipyridylium compounds may be used in fish hatcheries, bait rearing ponds, sport and commercial fishing areas, tropical fish cultures and marine and fresh water aquaria.

The dipyridylium compounds may be introduced into the aqueous environment in various ways known in the art. They may be added with other materials, dissolved in solvents, or added neat as desired.

The following examples illustrate the practice of the invention:

Example 1

Healthy Golden Shiners were injured with a scalpel contaminated with *Columnaris* bacteria from an infected fish. After 24 hours, all inoculated fish were examined and found diseased. Ten diseased fish were introduced into a series of 40 liter aquaria and treated with 1,1'-ethylene-2,2'-dipyridylium dibromide at concentrations of 1, 5 and 10 p.p.m. of cation. Four replicates of each dosage and 3 replicates of the untreated fish were established. Fish were not fed during this time and some mortality may have been due to starvation. The following is a tabulation of the results obtained:

TABLE I

| Conc. p.p.m. of cation of 1,1'-ethylene-2,2'-dipyridylium dibromide | Accumulated No. dead over total No. of fish | | Percent Survival | |
|---|---|---|---|---|
| | 8 hrs. | 220 hrs. | 8 hrs. | 220 hrs. |
| 0 | 28/30 | 28/30 | 6 | 6 |
| 1.0 | 0/40 | 5/40 | 100 | 80 |
| 5.0 | 0/40 | 4/40 | 100 | 90 |
| 10.0 | 0/40 | 2/40 | 100 | 95 |

Example 2

Two replicates of 30 minnows each in 1.2 gallons of pond water in a 10-pound tub carton were treated with 1,1'-ethylene-2,2'-dipyridylium dibromide at a concentration of 3.1 p.p.m. of the cation. Two replicates were also used for checks. The following table shows the results of treated and untreated *Gambusia* suffering from bacterial infection recorded as percent mortality:

TABLE II

| | Percent Mortality (hours) | | | | |
|---|---|---|---|---|---|
| | 24 | 48 | 72 | 144 | 240 |
| Treated | 5 | 5 | 5 | 10 | 10 |
| Check | 8 | 28 | 38 | 51 | 58 |

Example 3

To four holding troughs, each containing a minimum of 50 pounds or an estimated 15,000 Golden Shiners, was introduced 0, 1, 2 and 3 p.p.m. of N,N'-dimethyl 4,4'-dipyridylium dichloride cation. The fish were exposed to the treatments for 24 hours. Control ratings were made where 0=no control, +=some control, ++=good control (80–90%) and +++=excellent control (99+%). The following table indicates the results:

TABLE III

| N,N'-dimethyl 4,4'-dipyridylium dichloride p.p.m.: | Control rating |
|---|---|
| 0 | 0 |
| 1.0 | ++ |
| 2.0 | ++ |
| 3.0 | +++ |

The dipyridylium dihalide compounds of this invention have also been found effective in the protection of such fish as White Cloud Mountain Fish, Barb group, Danio group, including zebra, giant and spotted types, Betta splendens (Siamese Fighting Fish) and Gourami from diseases caused by parasitic microorganisms, particularly *Columnaris, Oodinium liminectum* and *Aeromonas liquificians* parasites.

As will be evident to those skilled in the art, various modifications on this process can be made or followed, in the light of the foregoing disclosure and discussion, without departing from the spirit or scope of the disclosure or from the scope of the following claims.

I claim:
1. A method of controlling fish diseases caused by bacteria and protozoa which comprises introducing into the aqueous environment of fish sufficient 1,1'-ethylene-2,2'-dipyridylium dihalide, wherein said halide is of atomic number 17 to 35 to provide a concentration of from 0.25 to 10 p.p.m. of cation.

2. A method according to claim 1, wherein the amount of said dipyridylium compound is in the range of 0.5 to 3.5 p.p.m. of cation.

3. A method of controlling fish diseases caused by *Columnaris* and *Oodinium liminectum* which comprises introducing into the aqueous environment of fish sufficient 1,1'-ethylene-2,2'-dipyridylium dihalide, wherein said halide is of atomic number 17 to 35 to provide a concentration in the range of from 0.5 to 5 p.p.m. of cation.

4. A method of controlling fish diseases caused by bacteria and protozoa which comprises introducing into the aqueous environment of fish sufficient amounts of compounds selected from the group consisting of the following formulas:

(I) 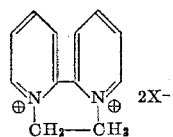

(II) 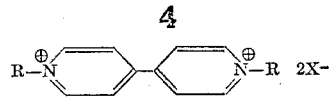

wherein X is halogen of atomic number 17 to 35 and R is lower alkyl of from 1 to 3 carbons, to provide a concentration of from 0.25 to 10 p.p.m. of cation.

5. A method of controlling fish parasites caused by bacteria and protozoa which comprises introducing into the aqueous environment of fish sufficient N,N'-dimethyl 4,4'-dipyridylium dihalide, wherein said halide is of atomic number 17 to 35 to provide a concentration of from 0.25 to 10 p.p.m. of cation.

6. A method according to claim 5 wherein the amount of said dipyridylium compound is in the range of 0.5 to 3.5 p.p.m. of cation.

References Cited by the Examiner

Stubb: Chem. Abst., volume 54, page 7959(a).

SAM ROSEN, *Primary Examiner.*